April 8, 1952    P. E. HAWKINSON    2,591,934
METHOD OF PRODUCING A SKID-RESISTANT
TREAD FOR PNEUMATIC TIRES
Filed March 29, 1950
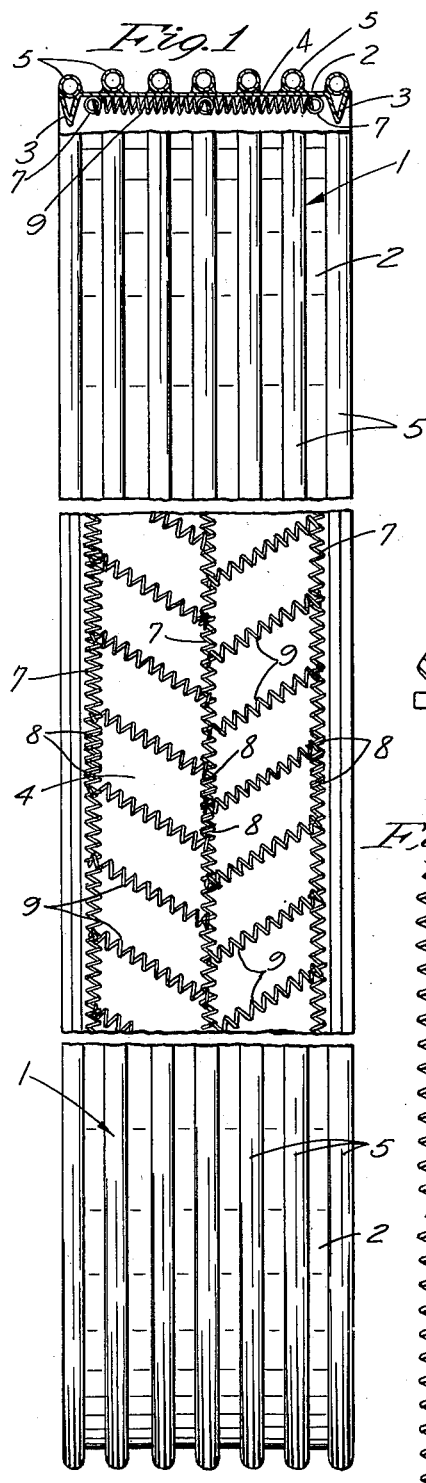
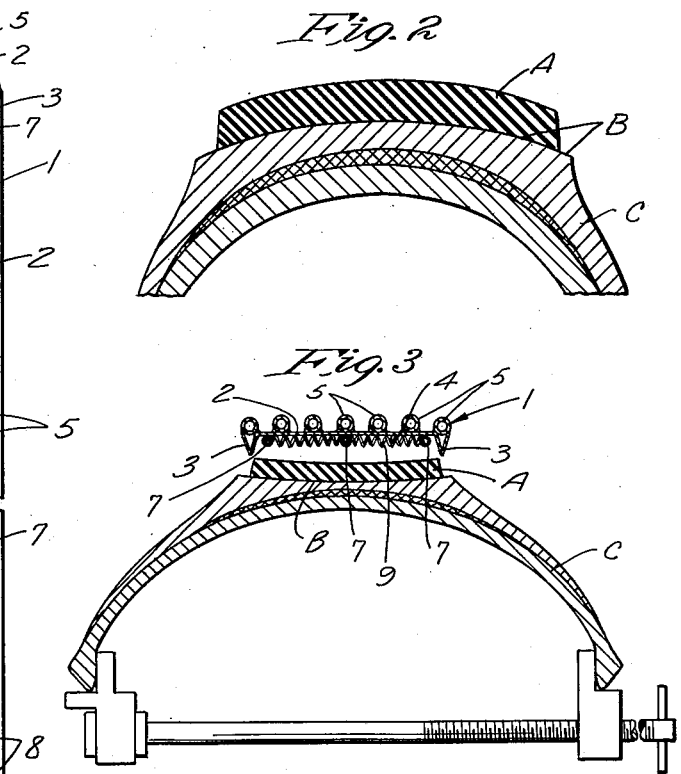
Inventor
Paul E. Hawkinson
By his Attorneys
Merchant & Merchant Patented Apr. 8, 1952

2,591,934

UNITED STATES PATENT OFFICE 2,591,934

METHOD OF PRODUCING A SKID-RESISTANT TREAD FOR PNEUMATIC TIRES

Paul E. Hawkinson, Minneapolis, Minn., assignor to Paul E. Hawkinson Company, Minneapolis, Minn., a corporation of Minnesota Application March 29, 1950, Serial No. 152,573

2 Claims. (Cl. 154—14)

My invention relates to the novel method of producing skid-resistant treads for pneumatic tire casings and, more particularly, to treads having imbedded therein lengths of coils or other serpentinely-bent wires, which, when worn, produce a plurality of disconnected generally U-shaped claw elements.

The primary object of my invention is the provision of a novel method for producing a tread of the type above described, which has coils or other lengths of serpentinely-bent wire extending not only circumferentially of the tread but also transversely of the tread.

A still further object of my invention is the provision of the novel method, whereby treads of the above type may be produced with a minimum amount of skill and with a great saving of time and material.

The above and still further objects of my invention will become apparent from the following detailed specification, appended claims, and attached drawings.

Referring to the drawings, wherein like characters indicate like characters throughout the several views:

Fig. 1 is a view in front elevation of a tire treading mold illustrating one step in my novel method, some parts being broken away and others shown in section;

Fig. 2 is a fragmentary sectional view of a tire carcass illustrating a different step in my novel process;

Fig. 3 is a view on a reduced scale illustrating a still further step in my novel method;

Fig. 4 is a view in section illustrating a still further step in my novel method and drawn to the same scale as Fig. 1; and Fig. 5 is a view of a serpentinely-formed length of resilient wire used in the practice of my novel method.

Referring with greater particularity to the drawings, the numeral 1 indicates, in its entirety, a tire treading mold of the type broadly disclosed and claimed in my United States Patent No. 1,917,262 and made up from an endless band 2 of sheet steel having generally U-shaped confining flanges 3 adjacent its opposite side edges which, together with the band 2, form a mold cavity 4. Secured by solder or the like to the peripheral outer surface of the mold 1 is an endless coil of steam-conducting tubing or the like 5.

The first step in my novel method comprises the deforming of a plurality of normally straight lengths of serpentinely-bent resilient wire (such as that identified by the numeral 6 in Fig. 5) to form individual circular loops 7 of less diameter than the internal diameter of the matrix 1. I hereby use the word "serpentinely" to cover not only coiled wire but wire which has been bent to form oppositely-opening U-shaped loops—or zigzags.

The next step in my novel method comprises placing of the loops 7 within said matrix in laterally-spaced relation to each other, preferably with one in the transverse center of the mold and one each adjacent the side edges of the mold 1. With the particular mold illustrated, this is accomplished by initially deforming the lengths of wire 6 into loops 7 of less diameter than the mold 1 and thereafter placing the loops 7 within the mold 1 and permitting the same to expand against the internal periphery of the mold by virtue of the tendency of the loops to resume their normally straight condition, all as more specifically described and claimed in my United States Patent No. 2,476,146.

The next step in my novel method comprises the securing of the free ends 8 of the loops 7 together sufficiently so that said loops 7 will not fall out of the mold under the action of gravity. As shown in Fig. 1, this may be accomplished by merely overlapping and nesting the ends 8.

The next step in my novel method comprises the disposing of a series of relatively short lengths of serpentinely-bent wire 9 between the central loop 7 and a side loop 7 in circumferentially spaced relation and diagonally of the loops, then securing the opposite ends of the lengths 9 one each to the adjacent spaced loop 7, disposing a second series of relatively short lengths of serpentinely-bent wire 9 between the central loop 7 and the other side loop 7 in circumferentially spaced relation and diagonally of the last named loops and oppositely to the first series of loops, and with the lengths of wire of the second series being in circumferentially staggered relation relative to the lengths of wire of the first series, and securing the opposite ends of the lengths of wire 9 of the second series, one each to the adjacent loops 7. Any desired circumferential spacing between the diagonally-positioned wires 9 may be adopted. The important thing is that all lengths of wire, including the loop 7 and short pieces 9, are either directly in contact with the internal peripheral surface of the mold 1 or substantially so.

The next step in my novel process comprises applying uncured tread rubber A to the worn crown B of a pneumatic tire casing C and placing the same within the annular matrix 1, so that the newly-applied tread material A is in contact with the wire elements 7 and 9; and the final step comprises applying heat to the coils 5 of the mold 1 and internal expanding pressure to the casing C (also as more particularly described and claimed in my afore-mentioned United States Patent No. 2,476,146), whereby to cure the vulcanized tread A to the tire casing C with the wire coils 7 and 9 imbedded therein immediately below the new road-engaging surface D (see Fig. 4).

What I claim is:

1. In a method of molding a skid-resistant tread for a pneumatic casing within a cylindrical matrix by compressing a strip of camel back on a tire casing into engagement with the inner surface of said matrix; the improvement which comprises deforming a pair of normally straight lengths of serpentinely bent wire into circular loops, placing said loops within the matrix in laterally spaced relation to each other and in frictional engagement with the inner surface of the matrix, disposing relatively short lengths of serpentinely bent wire in engagement with the matrix between said loops in circumferentially spaced relation and with the axes thereof intersecting the circumferential axes of the loops, and connecting the opposite ends of said short lengths of wire to the respective loops for positively retaining same in predetermined spaced positions, whereby upon completion of the molding operation the outer portions of the loops and intermediate short lengths of wire will be uniformly disposed in a cylindrical surface coincident with that of the completed tread.

2. In a method of molding a skid-resistant tread for a pneumatic tire casing within a cylindrical matrix by compressing a strip of camel back on a tire casing into engagement with the inner surface of said matrix; the improvement which comprises deforming three normally straight lengths of serpentinely bent wire into circular loops, placing said loops within the matrix in laterally spaced relation to each other and in frictional engagement with the inner surface of the matrix, securing the free ends of the loops together for retaining same in position within the matrix in predetermined spaced relation, disposing a series of short lengths of serpentinely bent wire between the central loop and a loop to one side thereof in circumferentially spaced relation and diagonally of the respective loops, placing a corresponding series of short lengths of serpentinely bent wire between the central loop and a loop to the opposite side thereof in circumferentially spaced relation and diagonally disposed relative to the respective loops and oppositely to the first series of loops and with the lengths of wire of one series being in circumferentially staggered relation relative to the lengths of wire of the other series, securing the opposite ends of the short lengths of wire to their respective loops with the adjacent ends of the two series of lengths of wire being secured to the central loop in alternation, the axes of the short lengths of wire intersecting the circumferential axes of the loops whereby upon completion of the molding operation a skid-resistant tread of predetermined design will be formed by the outer portions of the loops and the short lengths of wire disposed in a cylindrical surface coincident with that of the completed tread.

PAUL E. HAWKINSON.

REFERENCES CITED

The following references are of record in the file of this patent:

UNITED STATES PATENTS

| Number | Name | Date |
|---|---|---|
| Re.23,235 | Hawkinson | May 30, 1950 |
| 692,397 | Wilkinson | Feb. 4, 1902 |
| 1,083,231 | Wale | Dec. 30, 1913 |
| 1,111,419 | Wadsworth | Sept. 22, 1914 |
| 2,006,038 | Yamaki | June 25, 1935 |
| 2,479,474 | Crooker | Aug. 16, 1949 |

OTHER REFERENCES

Scientific-American, "Non Skid," pages 224 and 225, May 1943.